United States Patent
Delville et al.

(10) Patent No.: US 11,327,740 B2
(45) Date of Patent: May 10, 2022

(54) METHOD AND DEVICE FOR MANAGING AIRCRAFT EQUIPMENT SOFTWARE CONFIGURATIONS

(71) Applicant: SAFRAN ELECTRONICS & DEFENSE, Paris (FR)

(72) Inventors: Denis Delville, Paris (FR); Louis Théophile Thirion, Paris (FR); Thomas Monot, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/289,141

(22) PCT Filed: Nov. 27, 2019

(86) PCT No.: PCT/EP2019/082726
§ 371 (c)(1),
(2) Date: Apr. 27, 2021

(87) PCT Pub. No.: WO2020/114855
PCT Pub. Date: Jun. 11, 2020

(65) Prior Publication Data
US 2021/0389941 A1  Dec. 16, 2021

(30) Foreign Application Priority Data
Dec. 3, 2018  (FR) ....................... 1872245

(51) Int. Cl.
*G06F 8/65* (2018.01)
*G06F 8/71* (2018.01)
*G06F 21/64* (2013.01)

(52) U.S. Cl.
CPC .................. *G06F 8/65* (2013.01); *G06F 8/71* (2013.01); *G06F 21/64* (2013.01)

(58) Field of Classification Search
CPC ............... G06F 8/65; G06F 8/71; G06F 21/64
See application file for complete search history.

(56) References Cited

U.S. PATENT DOCUMENTS

| 6,438,468 B1 | 8/2002 | Muxlow et al. |
| 2004/0106404 A1* | 6/2004 | Gould ....................... G06F 8/65 |
| | | 455/431 |

(Continued)

FOREIGN PATENT DOCUMENTS

| EP | 2881859 A1 | 6/2015 |
| FR | 2987145 A1 | 8/2013 |

OTHER PUBLICATIONS

Feb. 12, 2020 International Search Report issued in International Patent Application No. PCT/EP2019/082726.

*Primary Examiner* — Wei Y Zhen
*Assistant Examiner* — Amir Soltanzadeh
(74) *Attorney, Agent, or Firm* — Oliff PLC; R. Brian Drozd

(57) ABSTRACT

A method and a device for managing software configurations of equipment of an aircraft, comprising a device for managing software configurations of equipment of the aircraft. The device for managing software configurations of equipment of the aircraft detects the availability of a communication link between a server on the ground and the aircraft, checks whether a configuration file is available and importing the configuration file, imports, from the server on the ground, one or more software updates identified in the configuration file and storage of the software update or updates in a temporary memory space; determines the instant as from which each update can be implemented, and demands the modification of the software configuration of the item or items of equipment with the software update or updates corresponding to the item or items of equipment.

12 Claims, 3 Drawing Sheets

(56) References Cited

U.S. PATENT DOCUMENTS

| | | | |
|---|---|---|---|
| 2009/0138516 A1* | 5/2009 | Young | G06F 8/61 |
| 2009/0138517 A1* | 5/2009 | McLain | G06F 16/93 |
| 2013/0067450 A1* | 3/2013 | Saugnac | H04L 41/082 |
| | | | 717/170 |
| 2014/0059534 A1 | 2/2014 | Daum et al. | |
| 2014/0282491 A1* | 9/2014 | Baraldi | G06F 8/61 |
| | | | 717/174 |
| 2016/0352412 A1* | 12/2016 | Di Costanzo | G06F 8/61 |

\* cited by examiner

METHOD AND DEVICE FOR MANAGING AIRCRAFT EQUIPMENT SOFTWARE CONFIGURATIONS

TECHNICAL FIELD

The present invention relates to a method and a device for managing aircraft equipment software configurations.

PRIOR ART

At the present time, the procedures for updating aircraft equipment software configurations require the action of an operator on board or in proximity to the aircraft. The operator must follow predefined procedures so as to avoid any error in updating and risk of putting the aircraft in a non-optimum operating mode that might have potentially dangerous consequences.

Conventionally, the management of updates is managed on the ground, through work requests. The maintenance operator climbs into the aircraft with software updates on a transportable medium, or imports the software update or updates through a communication link. The maintenance operator performs the update by following the written procedures, and visually checks on the screen that the new software configurations of the aircraft equipment are in accordance with the operation requested. The updates performed are entered by the operator on a paper document.

DISCLOSURE OF THE INVENTION

One object of the present invention is to propose a method and a device for managing aircraft equipment software configurations which requires limited human action, which is very reliable and which in addition can be at the initiative of an equipment or software supplier and/or of the aircraft supplier and/or of the operator of the aircraft and/or the aircraft maintenance manager, on all or only a previously defined set of the equipment.

In addition, the present invention aims to be able to perform software updates remotely with a certain degree of automation.

For this purpose, a method for managing aircraft equipment software configurations is proposed, characterised in that the aircraft comprises a device for managing aircraft equipment software configurations and in that the method comprises the steps, performed by the device for managing aircraft equipment software configurations, of:
  detecting the availability of a communication link between a server on the ground and the aircraft,
  checking whether a configuration file is available and importing the configuration file,
  importing, from the server on the ground, one or more software updates identified in the configuration file and storing the software update or updates in a temporary storage space,
  determining the instant as from which each update can be performed,
  demanding the modification of the software configuration of the item or items of equipment with the software update or updates corresponding to the item or items of equipment.

The invention also relates to a device for managing aircraft equipment software configurations, characterised in that the device for managing aircraft equipment software configurations is included in the aircraft and comprises:
  means for detecting the availability of a communication link between a server on the ground and the aircraft,
  means for checking whether one or more configuration files are available and importing the configuration file or files,
  means for importing, from the server on the ground, one or more software updates identified in the configuration file or files and storing the software update or updates in a temporary memory space,
  means for determining the instant as from which each update can be performed,
  means for demanding the modification of the software configuration of the item or items of equipment with the software update or updates corresponding to the equipment.

Thus it is possible to perform software updates automatically, remotely, reducing the human intervention, which are very reliable in terms of information technology security and which can be at the initiative of a supplier of equipment or software and/or of the supplier of the aircraft and/or of the operator of the aircraft and/or of the aircraft maintenance manager, on all or only a previously defined set of equipment.

According to a particular embodiment, the configuration file comprises a digital signature guaranteeing the integrity, the authenticity and the provenance of the data, identifiers of the aircraft equipment that must be updated, the version of the update that is to be performed for the equipment and the date at which the update can be performed.

Thus it is possible to secure the software updates.

According to a particular embodiment, the method further comprises the steps of obtaining information identifying the software update or updates and of comparing with the information contained in the configuration file.

Thus it is possible to identify the software version or versions that have just been updated, and to compare it or them with the information identifying the software update or updates included in the configuration file in order to obtain therefrom a statement of completeness, and optionally a good-for-flight statement.

According to a particular embodiment, the configuration file is generated by an equipment or software supplier and/or by a supplier of the aircraft and/or by an operator of the aircraft and/or by an aircraft maintenance manager, on all or only a previously defined set of the equipment.

According to a particular embodiment, the configuration file further comprises information representing the compatibility between the versions of updates of all the equipment of the aircraft, and/or the list of the places where the updates can be transferred and/or the quality of the communication link between the place of update and the aircraft and/or the cost of the communication for each link where the updates can be performed.

Thus the present invention makes it possible to optimise the time and place of importing the equipment software update or updates.

According to a particular embodiment, the modification of the software configuration of the item or items of equipment with the software update or updates corresponding to the item or items of equipment is demanded from an addressing table comprising information identifying each item of equipment and an address of each item of equipment comprising software for each item of equipment, information indicating whether a digital signature guaranteeing the integrity, the authenticity and the provenance of the data is necessary for the software updating of the equipment.

Thus the present invention makes it possible to perform the software updates in a secure manner in the information technology security sense and safe in the sense of flight safety.

According to a particular embodiment, if a digital signature guaranteeing the integrity, the authenticity and the provenance of the data is necessary for the software updating of the equipment, the addressing table includes information identifying the entity or entities having the authorisation to provide one or more software updates.

Thus the present invention makes it possible to perform the software updates in a secure manner in the sense of information technology security and safe in the sense of flight safety.

According to a particular embodiment, the table comprises information indicating the operating state or states of each item of equipment or of the aircraft wherein a software update can be performed.

Thus the present invention makes it possible to perform the software updates in a secure manner in the sense of flight safety.

According to a particular embodiment, the addressing table is installed in the aircraft when the aircraft is maintained.

According to a particular embodiment, the addressing table is created by the software configuration management device by broadcasting a discovery message to all the equipment on the aircraft and by analysing messages received from equipment in response to the discovery message and/or using default values in the case of non-response or partial response from at least one item of equipment of the aircraft.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

Figure 1:
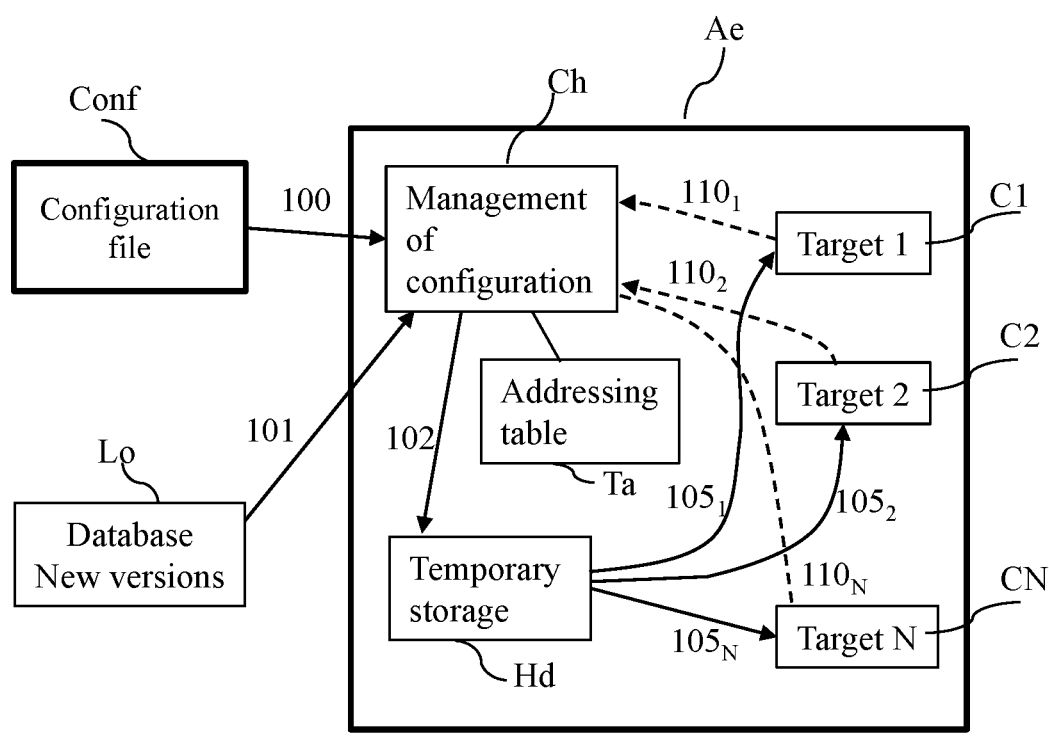
FIG. 1 shows a schematic view of a system for managing aircraft equipment software configurations wherein the present invention is implemented.

FIG. 1 shows a schematic view of a system for managing aircraft equipment software configurations that comprises on the ground a configuration file Conf, a database Lo comprising new software configurations and, on board an aircraft Ae, a device Ch for managing software configurations of equipment of the aircraft Ae that manages the updating of equipment C1 to CN by means of an addressing table Ta and temporary storage means Hd.

The configuration file Conf lists all the identifiers of the equipment C1 to CN of the aircraft Ae that must be updated, the version of the update or the versions of the updates that are to be made for the equipment C1 to CN, information representing the compatibility between the versions of updates of all the equipment C1 to CN of the aircraft Ae, the date as from which the update can be made and optionally the list of places where the updates can be imported, the quality of the communication link between the place of updating and the aircraft, and the cost of the communication for each link where the updates can be transferred. The configuration file Conf is for example managed by the supplier of one or more items of equipment or software of the aircraft Ae and/or of the supplier of the aircraft and/or of the operator of the aircraft and/or the aircraft maintenance manager, on all or only a previously defined set of equipment of the aircraft.

It should be noted here that, in a particular embodiment, a plurality of configuration files are created so as to classify the updates of the equipment of the aircraft in accordance with predefined criteria, such as for example the criticality level of the equipment with regard to security or safety.

The configuration file or files are for example managed in accordance with a schedule for maintaining the aircraft equipment. The or each configuration file comprises for example a digital signature guaranteeing the integrity, the authenticity and the provenance of the data of the supplier of one or more items of equipment or of at least one item of software of the aircraft Ae and/or of the supplier of the aircraft and/or of the operator of the aircraft and/or of the aircraft maintenance manager, on all or only a previously defined set of the equipment.

The database Lo comprises equipment software updating files. Each software update is for example signed by the supplier of one or more items of equipment or software of the aircraft Ae and/or by the supplier of the aircraft and/or by the operator of the aircraft and/or by the aircraft maintenance manager.

Periodically, for example when the aircraft Ae is on the ground or a communication link exists between the aircraft and a server on the ground, the device Ch for managing software configurations of equipment of the aircraft Ae checks whether a configuration file is available by a communication means. If so, the software configuration management device Ch imports the configuration file as indicated by the arrow denoted 100.

The software configuration management device Ch checks whether the digital signature guaranteeing the integrity, the authenticity and the provenance of the data included in the configuration file downloaded is correct, i.e. that it corresponds to the supplier of the item or items of equipment or software identified in the configuration file and/or to the supplier of the aircraft and/or to the operator of the aircraft and/or to an aircraft maintenance manager.

If so, the software configuration management device Ch, using the addressing table Ta, compares, for each item of equipment comprising software identified in the configuration file downloaded, the version of the update included in the configuration file with the version of the software currently installed in the equipment.

If at least one update version included in the configuration file is different from a version of the software currently installed in an item of equipment, an importing of the update is programmed.

The programming of the importing of the update is dependent on the date included in the configuration file, the place where the aircraft is located, the quality of the communication link between the place of update and the aircraft, and the cost of the communication at the place at which the aircraft is located.

When a communication link exists between the aircraft and a server on the ground at the time of updating or after the time of updating, the software configuration management device Ch proceeds with the importing denoted 101 in FIG. 1 of the updating item or items of software. The item or items of updating software are imported from the database Lo that includes the equipment software updating files.

The software configuration management device Ch checks whether the digital signature guaranteeing the integrity, the authenticity and the provenance of the data of each update corresponds to that of the entity that has authorisation for generating and requesting the installation of a software update and, when the check is positive, the downloaded file or files are stored in the temporary storage means Hd. The storage in the temporary storage means Hd is represented by the arrow 102.

The software configuration management device Ch next proceeds with the downloading of each update into the equipment comprising the software concerned.

Each item of equipment checks whether the update is actually intended for it and proceeds with the installation of the software update if the equipment comprising software is in an operating state that allows installation of the update.

The installations of updates are represented by the arrows denoted $105_1$ and $105_N$ in FIG. 1.

When the software update is done, the equipment comprising software that made the update transfers a message denoted $110_1$ to $110_N$ to the software configuration management device Ch indicating to it the update version installed.

The software configuration management device Ch checks whether each item of equipment comprising software identified in the configuration file Conf has installed the update version included in the configuration file Conf.

In a particular embodiment, when each item of equipment comprising software identified in the configuration file Conf has installed the version of the update included in the configuration file Conf, the software configuration management device Ch transfers, to the ground, on a server, the software configuration of the aircraft equipment.

If all the updates are performed and are compatible with each other and/or with the update or updates described in the configuration file, the software configuration management device Ch determines that the aircraft Ae can be authorised to fly.

It should be noted here that the determination that the aircraft Ae can be authorised to fly can be made on the ground also, since the software configuration management device Ch transferred thereto the software version of each item of equipment.

Likewise, the authorisation to fly can be validated by a maintenance operator, on board or on the ground.

The addressing table Ta comprises the information identifying each item of equipment comprising software of the aircraft and the address of each item of equipment comprising software of the aircraft that is able to be updated. The addressing table optionally comprises, for each item of equipment and/or software, information indicating whether a digital signature guaranteeing the integrity, the authenticity and the provenance of the data is necessary for the software update of the equipment. If a digital signature guaranteeing the integrity, the authenticity and the provenance of the data is necessary for the software update of the equipment, the addressing table Ta may optionally comprise the identifiers of the entities that have the possibility of providing a software update. These entities could be the supplier of the equipment comprising software and/or a supplier of software and/or by a supplier of the aircraft and/or by an operator of the aircraft and/or by an aircraft maintenance manager. In the case where the addressing table Ta does not comprise the identifiers of the entities that have the possibility of providing a software update, any entity that is capable of digitally signing the software update will have the possibility of providing a software update.

The addressing table Ta comprises information indicating the state or states of operation of each item of equipment comprising software wherein a software update can be performed. The state is for example a state related to the situation of the aircraft, such as for example a flight phase, or of presence on the ground. The operating state is for example the fact that the engines are stopped or not.

The addressing table Ta is for example generated on the ground and installed during maintenance of the aircraft Ae or is created dynamically by the software configuration management device Ch. For example, the software configuration management device Ch broadcasts a discovery message to all the aircraft equipment.

Each item of equipment comprising software that is able to be updated, receiving the discovery message, sends in response a message to the software configuration management device Ch. The message sent in response comprises information, the identifier and the address of the equipment comprising an item or items of software of the aircraft, information indicating whether a digital signature guaranteeing the integrity, the authenticity and the provenance of the data is necessary for the software update of the equipment. If a digital signature guaranteeing the integrity, the authenticity and the provenance of the data is necessary for the software update of the equipment, the message sent in response comprises the identifiers of the entities that have the possibility of providing a software update. These entities could be the supplier of the equipment comprising software or third parties, if these are authorised to perform a software update on this computer.

According to a particular embodiment, the message sent in response also comprises the state or states wherein the equipment comprising software must be during a software update.

According to a particular embodiment of the present invention, the addressing table Ta comprises predefined information that is used in the event of inability of equipment comprising software to process a discovery message, or to provide in the response message all the information mentioned above.

Figure 2:
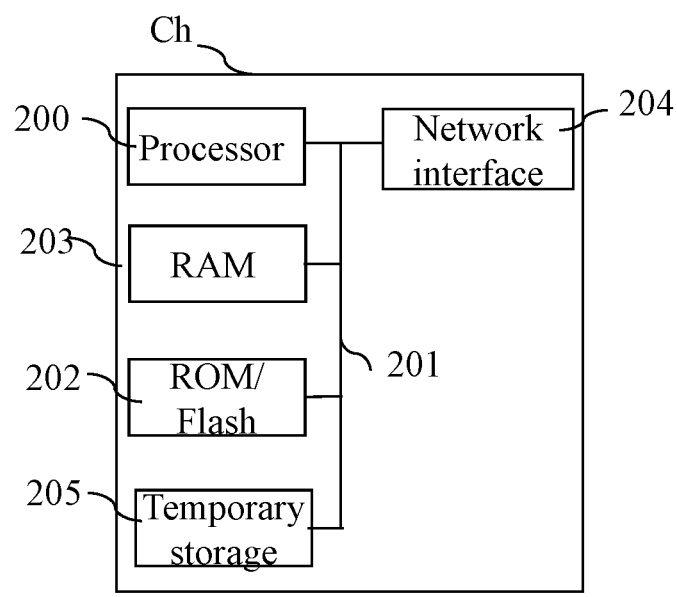
FIG. 2 shows an example of architecture of a device for managing aircraft equipment software configurations according to the present invention.

FIG. 2 shows an example of architecture of a device for managing software configurations of aircraft equipment according to the present invention.

The software configuration management device Ch comprises:
- a processor, microprocessor or microcontroller, an FPGA 200;
- a volatile memory 203;
- a non-volatile memory 202;
- optionally a temporary storage device 205 (hard disk, flash disk, SD card, USB stick, internal flash memory, etc.);
- a network interface 204 for transmitting files over a radio or wired link;
- a communication bus 201 connecting the processor 200 to the ROM memory 202, to the RAM memory 203, to the temporary storage means HD and to the network interface 204.

The processor 200 is capable of executing instructions loaded in the volatile memory 203 from the non-volatile memory 202, from an external memory (not shown), from a storage medium, such as an SD card or the like, or from a communication network. When the software configuration management device Ch is powered up, the processor 200 is capable of reading instructions from the volatile memory 203 and executing them. These instructions form a computer program that causes the implementation, by the processor 300, of all or part of the method described in relation to FIG. 3.

Figure 3:
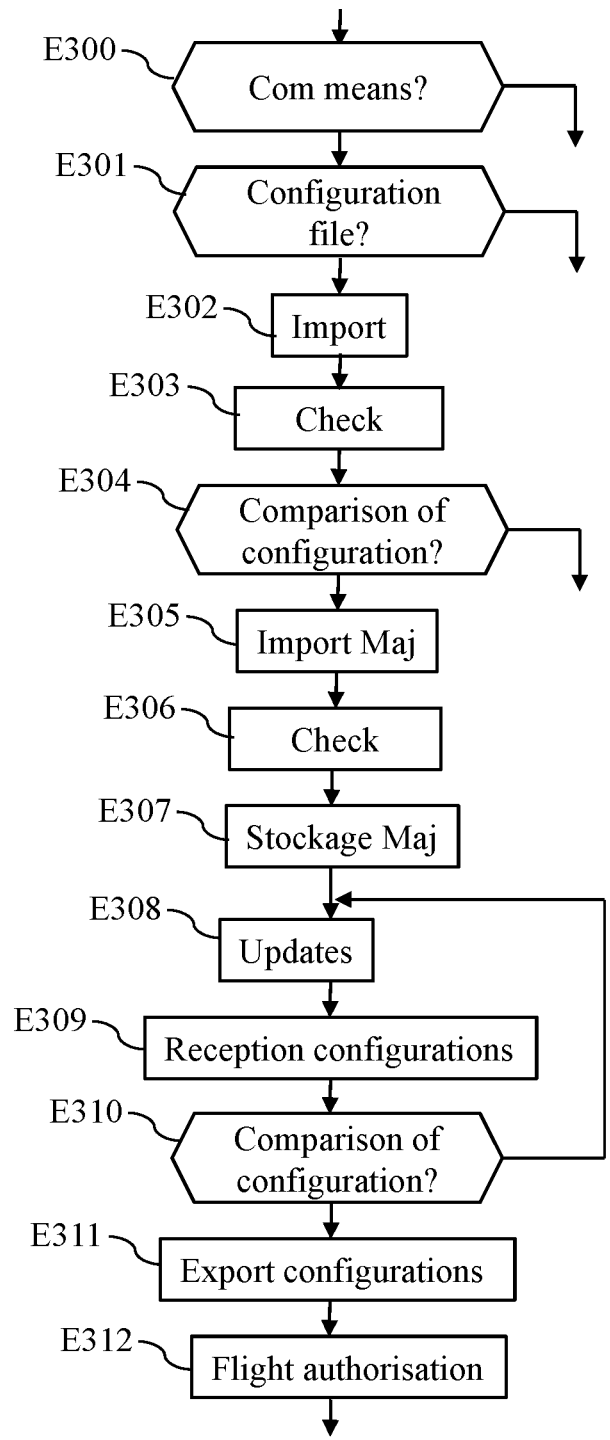
FIG. 3 shows an example of an algorithm implemented by a device for managing aircraft equipment software configurations according to the present invention.

All or part of the method described in relation to FIG. 3 can be implemented in software form by the execution of a set of instructions by a programmable machine, such as a processor, microprocessor, a DSP (digital signal processor) or a microcontroller, or be implemented in hardware form by a machine or dedicated component, such as an FPGA (field-programmable gate array) or an ASIC (application-specific integrated circuit).

FIG. 3 shows an example of an algorithm executed by the device for managing software configurations of aircraft equipment according to the present invention.

The present algorithm is described in an example wherein it is executed by the processor 200 of the device for managing software configurations of aircraft equipment.

At the step E300, the processor 200 detects that a communication link between a server on the ground and the aircraft is available.

At the step E301, the processor 200 checks whether a configuration file is available on a data-processing device communicating on the ground, such as a computer server of the technical and maintenance services of the operator of the aircraft.

If so, the processor 200 passes to the step E302. If not, the processor 200 interrupts the present algorithm.

At the step E302, the processor 200 demands the importing, by means of the network interface 204, of the configuration file Conf.

The configuration file Conf lists all the identifiers of the equipment C1 to CN of the aircraft Ae that must be updated, the version of the update or the versions of the updates that are to be made for the equipment C1 to CN, information representing the compatibility between the versions of updates of all the equipment C1 to CN of the aircraft Ae, the time as from which the update can be made and optionally the list of the places where the transfer of the updates can be made, the quality of the communication link between the place of updating and the aircraft, the cost of the communication for each place where the transfer of the updates can be made. The configuration file Conf is for example managed by the supplier of one or more items of equipment or software of the aircraft Ae and/or the supplier of the aircraft and/or the operator of the aircraft and/or the aircraft maintenance manager, on all or only a previously defined set of the equipment.

It should be noted here that, in a particular embodiment, a plurality of configuration files are created so as to classify the updates of the equipment of the aircraft in accordance with predefined criteria, such as for example the criticality level of the equipment with regard to safety.

The configuration file or files are for example managed according to a maintenance schedule for the aircraft equipment. The or each configuration file comprises for example a digital signature guaranteeing the integrity, the authenticity and the provenance of the data of the supplier of one or more items of equipment or of at least one item of software of the aircraft Ae and/or of the supplier of the aircraft and/or of the operator of the aircraft and/or of the aircraft maintenance manager, on all or only a previously defined set of the equipment.

At the step E303, the processor 200 checks whether the digital signature guaranteeing the integrity, the authenticity and the provenance of the data included in the configuration file downloaded corresponds to that of the entity which has authorisation for generating and requesting the installation of a software update identified in the configuration file.

If so, the processor 200 passes to the step E304 and, for each item of equipment comprising software identified in the configuration file downloaded, compares the version of the update included in the configuration file with the version of the software currently installed in the equipment.

If at least one update version included in the configuration file is different from a version of the software currently installed in an item of equipment, the processor 200 passes to the step E305.

If not, the processor 200 interrupts the present algorithm.

At the step E305, the processor 200 programs an importing of the software update.

The programming of the update is dependent on the date included in the configuration file and/or on the place where the aircraft is located and/or on the quality of the communication link between the place of update and the aircraft and/or on the cost of the communication to the place at which the aircraft is located.

When the conditions related to the programming of the update are fulfilled, the processor 200 proceeds with the importing of the item or items of updating software. The item or items of updating software are imported from the database Lo that comprises the equipment software updating files.

The database Lo comprises the equipment software update files. Each software update is for example signed by the supplier of the equipment comprising software for which the update must be made.

At the step E306, the processor 200 checks whether the digital signature guaranteeing the integrity, the authenticity and the provenance of the data of each update corresponds to that of the entity that has authorisation to generate and request the installation of a software update and, when the check is positive, the processor 200 passes to the step E307 and demands the storage of the file or files downloaded into the temporary storage means Hd.

At the step E308, the processor 200 next proceeds with the downloading of each update into the equipment comprising software concerned, using the content of the addressing table Ta.

The addressing table Ta comprises the information identifying each item of equipment comprising software of the aircraft and the address of each item of equipment comprising software of the aircraft that is able to be updated. The addressing table optionally comprises, for each item of equipment and/or software, information indicating whether a digital signature guaranteeing the integrity, the authenticity and the provenance of the data is necessary for the software updating of the equipment. If a digital signature guaranteeing the integrity, the authenticity and the provenance of the data is necessary for the software updating of the equipment, the addressing table Ta comprises the identifiers of the entities that have the possibility of providing a software update. These entities could be the supplier of the equipment comprising a software or third parties, if they are authorised to perform a software update on this computer.

The addressing table Ta comprises information indicating the operating state or states of each item of equipment comprising software wherein a software update can be performed. The state is for example a state related to the situation of the aircraft, such as for example a flight phase, or presence on the ground. The operating state is for example the fact that the motors are stopped or not.

The addressing table Ta is for example generated on the ground and installed while the aircraft Ae is maintained or is created dynamically by the software configuration management device Ch. For example, the software configuration management device Ch broadcasts a discovery message to all the equipment of the aircraft.

Each item of equipment comprising software that is able to be updated, receiving the discovery message, sends in response a message to the software configuration management device Ch. The message sent in response comprises information, the identifier and the address of the equipment comprising an item or items of software of the aircraft, information indicating whether a digital signature guaranteeing the integrity, the authenticity and the provenance of the data is necessary for the software update of the equipment. If a digital signature guaranteeing the integrity, the authenticity and the provenance of the data is necessary for the software update of the equipment, the message sent in response comprises the identifiers of the entities that have the possibility of providing a software update. These entities could be the supplier of the equipment comprising software or third parties, if they are authorised to perform a software update on this computer.

The message sent in response also comprises the state or states in which the equipment comprising software must be during a software update.

According to a particular embodiment of the present invention, the addressing table Ta comprises predefined information that is used in the case of inability of equipment comprising software to process a discovery message, or to provide, in the response message, all the information mentioned above.

Each item of equipment checks whether the update is actually intended for it and proceeds with the installation of the software update if the equipment is in an operating state that allows the installation of the update.

When the software update is performed, the equipment that made the update transfers a message to the software configuration management device Ch indicating to it the update version installed. This message is received at the step E309.

At the step E310, the processor 200 checks whether each item of equipment identified in the configuration file Conf has installed the version of the update included in the configuration file Conf.

If so, the processor 200 passes to the step E311. If not, the processor 200 returns to the step E308.

At the step E311, the processor 200 demands the transfer on the ground of the software version of each item of equipment on a server.

At the step E312, the processor 200 checks whether all the updates are compatible with each other and in agreement with the content of the configuration file and, if so, the software configuration management device Ch determines that the aircraft Ae can be authorised to fly.

It should be noted here that the determination that the aircraft Ae can be authorised to fly can be made on the ground also, since the software configuration management device Ch has transferred thereto the software version of each item of equipment.

Likewise, the authorisation to fly can be validated by a maintenance operator, on board or on the ground.

The invention claimed is:

1. A method for managing aircraft equipment software configurations of an aircraft, the method comprising:
    detecting an availability of a communication link between a server on a ground and the aircraft,
    checking, when a communication link is available, whether a configuration file is available on the server and importing the configuration file in response to the configuration file is available, the configuration file comprising information representing at least one item selected from a group comprising: a compatibility between versions of updates of all equipment of the aircraft, a list of places where importing of at least one software update can be done, quality of a communication link between the place of updating and the aircraft, and a cost of a communication for each place where transfer of updates can be done,
    programming, when the configuration file is available and from the configuration file, the importing of the at least one software update, the programming of the importing of the update depending on a time included in the configuration file and on a place in which the aircraft is situated and on the quality of the communication link between the place of update and the aircraft and on the cost of the communication at the place at which the aircraft is located,
    importing, according to the programming, from the server on the ground, one or more software updates identified in the configuration file and storing the one or more software updates in a temporary storage space,
    requesting a modification of a software configuration of one or more items of equipment with the one or more software updates corresponding to the one or more items of equipment.

2. The method according to claim 1, wherein the configuration file comprises a digital signature guaranteeing integrity, authenticity and provenance of data, identifiers of aircraft equipment that must be updated, a version of the update that is to be performed for the equipment and a date at which the update can be performed.

3. The method according to claim 2, wherein the method further comprises determining whether all updates are compatible with each other and in agreement with the content of the configuration file, and if so determining that the aircraft can be authorised to fly.

4. The method according to claim 1, wherein the configuration file is generated by an equipment or software supplier or by a supplier of the aircraft or by an operator of the aircraft or by an aircraft maintenance manager, on all or only a previously defined set of the equipment.

5. The method according to claim 1, wherein the modification of the software configuration of the one or more items of equipment with the one or more software updates corresponding to the one or more items of equipment is requested from an addressing table comprising information identifying each item of equipment and an address of each item of equipment comprising software for each item of equipment, information indicating whether a digital signature guaranteeing the integrity, the authenticity and the provenance of the data is necessary for the software updating of the equipment.

6. The method according to claim 5, wherein, if a digital signature guaranteeing integrity, authenticity and provenance of data is necessary for the software updating of the equipment, the addressing table identifies one or more entities having authorisation to provide one or more software updates.

7. The method according to claim 1 wherein the a table comprises information indicating at least one operating state of each item of equipment or of the aircraft where a software update can be performed.

8. The method according to claim 5, wherein the addressing table is installed in the aircraft when the aircraft is maintained.

9. The method according to claim 5, wherein the addressing table is created by the software configuration management device by broadcasting a discovery message to all equipment on the aircraft and from the an analysis of messages received from equipment in response to the discovery message or using default values in case of a non-response or a partial response from at least one item of equipment of the aircraft.

10. A device for managing aircraft equipment software configurations, wherein the device for managing aircraft equipment software configurations is included in the aircraft and comprises circuitry causing the device to perform:
   detecting the availability of a communication link between a server on the ground and the aircraft,
   checking, when a communication link is available, whether a configuration file is available on the server and for importing the configuration file if the configuration file is available, the configuration file comprising information representing the compatibility between the versions of updates of all the equipment of the aircraft, and/or the list of the places where the importing of the at least one update can be done and/or the quality of the communication link between the place of updating and the aircraft and/or the cost of the communication for each place where the transfer of updates can be done,
   programming, when the configuration file is available and from the configuration file, the importing of the at least one software update, the programming of the importing of the update depending on the time included in the configuration file and on the place in which the aircraft is situated and on the quality of the communication link between the place of update and the aircraft and on the cost of the communication at the place at which the aircraft is located,
   importing, according to the programming, from the server on the ground, one or more software updates identified in the configuration file or files and storing the software update or updates in a temporary memory space,
   demanding the modification of the software configuration of the item or items of equipment with the software update or updates corresponding to the item or items of equipment.

11. A nontransitory storage medium that stores a computer program comprising instructions for implementing, by a device comprising a processor, the method according to claim 1, when the computer program is executed by the processor of the device.

12. A device for managing aircraft equipment software configurations, wherein the device for managing aircraft equipment software configurations is included in an aircraft and comprises circuitry causing the device to perform:
   detecting an availability of a communication link between a server on a ground and the aircraft,
   checking, when a communication link is available, whether a configuration file is available on the server and importing the configuration file in response to the configuration file is available, the configuration file comprising information representing at least one item selected from a group comprising: a compatibility between versions of updates of all equipment of the aircraft, a list of places where importing of at least one software update can be done, quality of a communication link between the place of updating and the aircraft, and a cost of a communication for each place where transfer of updates can be done,
   programming, when the configuration file is available and from the configuration file, the importing of the at least one software update, the programming of the importing of the update depending on a time included in the configuration file and on a place in which the aircraft is situated and on the quality of the communication link between the place of update and the aircraft and on the cost of the communication at the place at which the aircraft is located,
   importing, according to the programming, from the server on the ground, one or more software updates identified in the configuration file or files and storing the one or more software updates in a temporary memory space,
   requesting a modification of a software configuration of one or more items of equipment with the one or more software updates corresponding to the one or more items of equipment.

* * * * *